Figure 1:
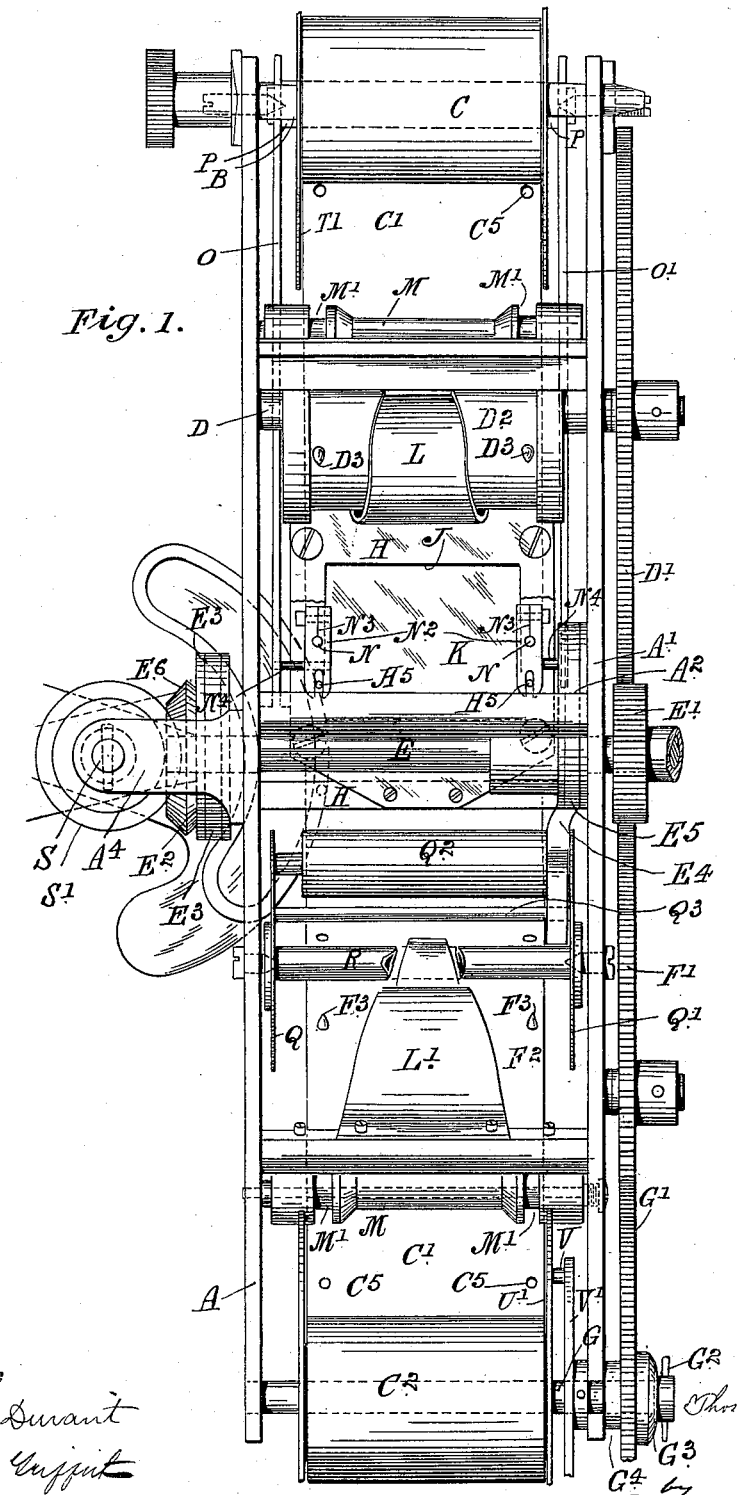

No. 611,231.  
T. H. BLAIR.  
KINETOGRAPHIC CAMERA.  
(Application filed Nov. 2, 1896.)  
Patented Sept. 27, 1898.  
(No Model.)  
2 Sheets—Sheet 1.

Witnesses  
Thomas Durant  
Elizabeth Guffut

Inventor:  
Thos. H. Blair,  
by  
his Atty.

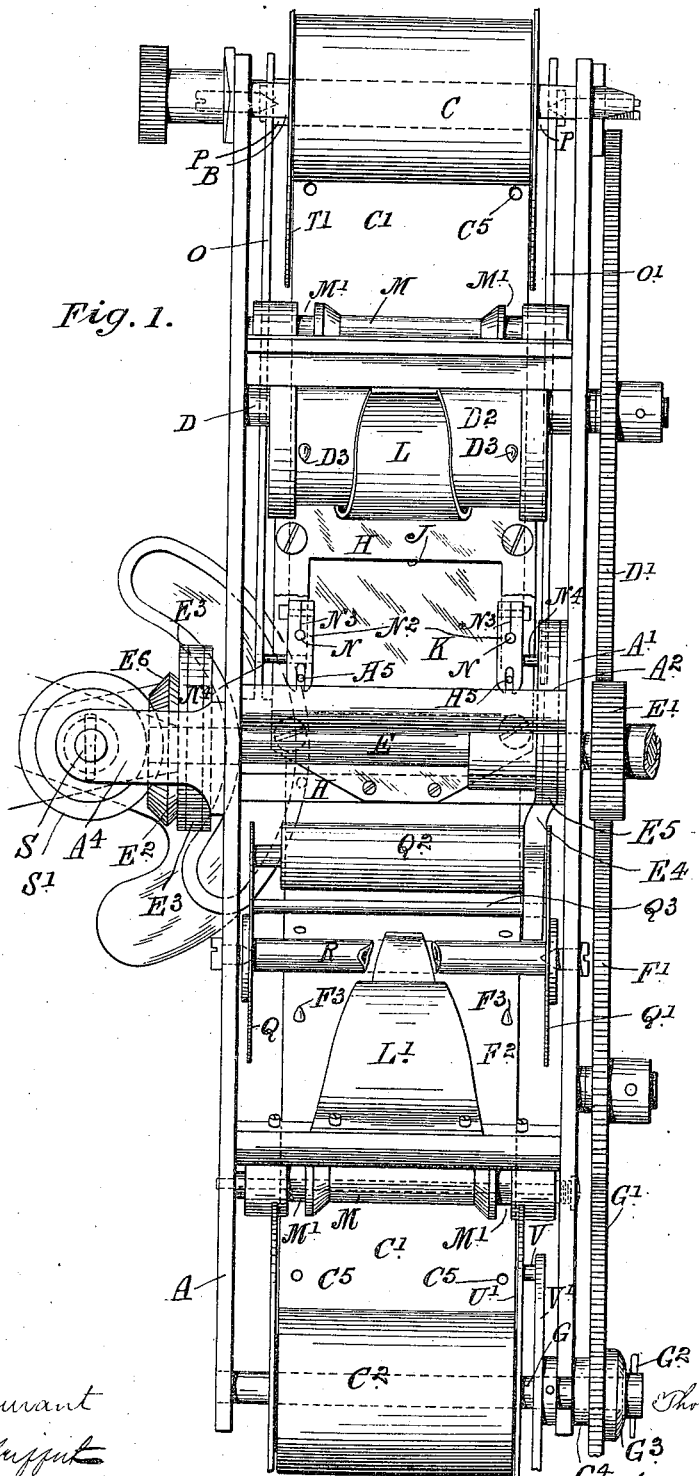

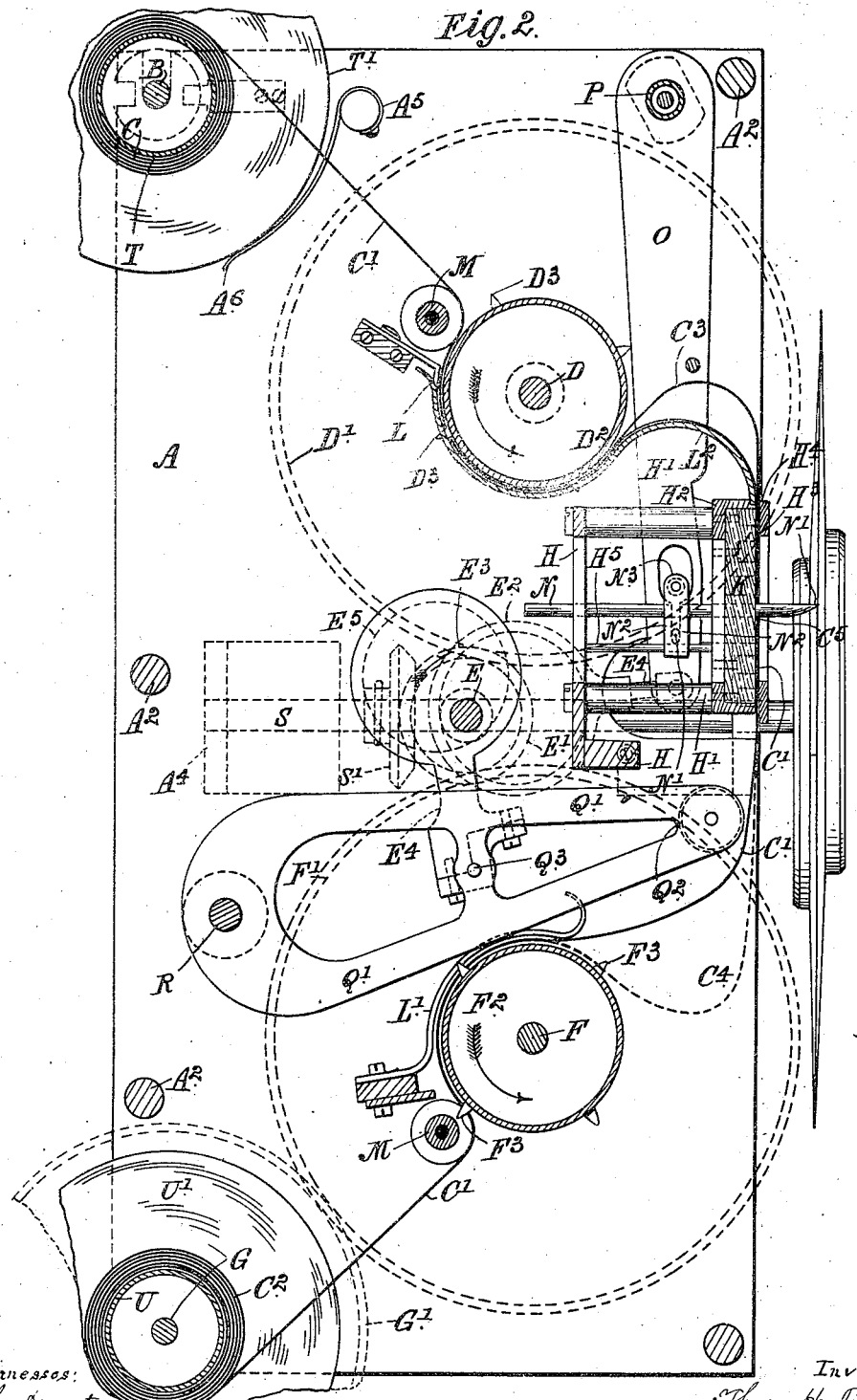

UNITED STATES PATENT OFFICE.

THOMAS HENRY BLAIR, OF NORTHBOROUGH, MASSACHUSETTS.

KINETOGRAPHIC CAMERA.

SPECIFICATION forming part of Letters Patent No. 611,231, dated September 27, 1898.

Application filed November 2, 1896. Serial No. 610,884. (No model.)

*To all whom it may concern:*

Be it known that I, THOMAS HENRY BLAIR, a citizen of the United States of America, residing at Northborough, in the State of Massachusetts, have invented certain new and useful Improvements in or Relating to Photographic Film-Exposing Apparatus, of which the following is a specification.

This invention has for its object to construct a film-exposing apparatus which will enable the successive portions of a continuous sensitized film or ribbon to be rapidly and successively exposed before development for the production of photographic negatives or positives or for exposing the film after positives have been produced upon it—as, for example, in apparatus in which the pictures are exposed in rapid succession either to the direct view of the spectator or to projection apparatus for lantern displays.

According to one part of this invention the film-exposing apparatus comprises devices whereby each section of the film is jerked onward with great rapidity after exposure in order to lengthen the period which between such movements is available for exposure. By thus lengthening the period of exposure the efficiency of the apparatus is improved, particularly in respect of the optical impression produced on the observer of the pictures when they are displayed by projection.

According to other parts of this invention improved means are provided in such apparatus to insure the proper centering or registering of each portion of the film at the time of exposure with the aperture at which it is to be exposed.

In the accompanying drawings, Figure 1 illustrates in end elevation, and Fig. 2 in side elevation one construction of apparatus according to this invention by which the registering or centering and subsequent rapid onward movement of successive portions of a continuous film is secured, one of the cheek-plates of the apparatus being removed in Fig. 2 and certain of the parts being shown in section for the sake of clearness. The apparatus illustrated in the before-mentioned figures is intended to be placed within a suitable casing, the latter being provided with doors which permit of its use in conjunction with projection apparatus or make the apparatus light-tight, according as the apparatus is used for projecting views or for taking photographs, respectively.

A A' are two cheek-plates, kept apart and retained in proper position relatively to each other by cross-stays $A^2$.

B is a spindle the ends of which are journaled in the cheek-plates A A'. It carries a spool C, of continuous film, hereinafter referred to as the "supply-spool," to which is supplied a frictional brake to prevent the film unwinding except when a positive pull is applied to it. This brake and spool are hereinafter described in detail.

D, E, and F are other spindles, which also are journaled at their ends in the cheek-plates. Of these E is the driving-spindle, to which rotation can be imparted from any suitable source of power.

E' is a toothed pinion fixed upon the spindle E. With it gear spur-wheels D' and F', fixed on the spindles D and F, respectively.

G is a spindle journaled in the cheek-plates A A' and geared by a spur-wheel G' to the spur-wheel F', and so to the driving-spindle E.

$C^2$ is a spool, hereinafter referred to as the "receiving-spool," formed of the film which has been exposed.

C' is film intermediate between the supply and receiving spools.

From the foregoing it will be seen that the spindles D E F G are geared together by spur-gearing, so that they all rotate together when the driving-spindle E is operated. The dimensions of the spur-wheels D' F', geared to the pinion E', are such that they both have the same angular velocity when they are turned by the said pinion. Either the receiving-spool $C^2$ or the spur-wheel G' is engaged with the shaft G by friction only, so that the speed of rotation of the receiving-spool can vary in relation to that of the shaft which operates it, in order that the film, which is moved, as will hereinafter appear, with a mean linear velocity which is uniform, may be properly wound on the receiving-spool no matter what amount of film may have accumulated upon it.

Upon the spindles D and F drums $D^2$ and $F^2$, respectively, are fixed. It is by these drums that the film, at the places where it is operated by them, is moved onward with uniform velocity, for on the drum $D^2$ are projections $D^3$, and on the drum $F^2$ projections $F^3$, properly placed to engage with perforations $C^5$ provided at intervals in the continuous film near its edges.

II is a frame fixed transversely between the cheek-plates A A'. It supports four pillars H', which in turn support an open rectangular frame $II^2$, upon which is secured a cover-plate $II^3$, Fig. 1. In the frame H $II^2$ and the cover-plate $II^3$ is a central rectangular passage or opening J, Fig. 1, which when the apparatus is employed in taking photographic pictures is closed by a block K, which is received in a rabbet of the frame $II^2$ and is readily removable to enable the image on the portion of film stretched, as hereinafter described, across the opening to be viewed or projected. Just sufficient clearance $II^4$ is provided between the cover-plate $H^3$ and the adjacent portion of the frame $II^2$ to permit the passage of the film C'.

L L' are guide-plates in proximity to the drums $D^2 F^2$, respectively. They are attached to the cheek-plates A A' and are so disposed as to prevent the film from leaving the peripheries of these drums, around which it is led from the supply-spool C to the receiving-spool $C^2$ in the path indicated by the line C', which in Fig. 2 indicates in section the portion of the film intermediate between the supply and receiving spools. The guide-plate L is provided with an extension $L^2$, over which the film passes from the drum $D^2$ to the clearance-opening $II^4$ between the cover-plate $II^3$ and the frame $H^2$.

M are guide-rollers pivoted between the cheek-plates A A' to aid in guiding the film. They are grooved, as at M', Fig. 1, so as to clear the projections $D^3 F^3$ on the drums $D^2 F^2$.

Rotation of the drums $D^2 F^2$, which occurs in the directions indicated by the arrows upon them in Fig. 2, would cause the film to pass from the drum $D^2$ to the drum $F^2$ continuously and at uniform speed, assuming that the driving-shaft E be rotated uniformly, as it is intended to be; but the apparatus comprises an intermittent feeding device as well as a retaining device, and the former operates to give the film an intermittent movement in the frame $II^2$ as it passes from the drum $D^2$ to the drum $F^2$. During the detention of the film in the frame $II^2$ by the retaining device, which will presently be described in detail, the continued rotation of the drum $D^2$ causes the film above the frame $II^2$ to rise in a loop, such as is indicated by the curve $C^3$ in Fig. 2, and during the same period the portion of film extending from the lower edge of the frame $II^2$ to the drum $F^2$ will be caused by the continued movement of that drum to have the slack existing therein partially taken up, so as to hang in some such curve as that in which it is shown in full line. The necessity for the formation of slack in the loop $C^3$ and the partial taking up of slack in the portion of film below the frame $II^2$ will be appreciated when the description hereinafter furnished of the operation of the rest of the apparatus is perused. The said retaining and intermittent feeding devices are now to be described.

The retaining device comprises two pins N, with tapered points or ends N'. They slide endwise in holes formed in portions of the frames H and $II^2$ and have fitted upon them blocks $N^2$, which have jaws $N^3$ embracing guide-bars $II^5$, secured in the frames H $H^2$ aforesaid. By thus engaging the blocks with the guide-bars $II^5$ the pins N are prevented from rotating about their own axes, and this is a matter of importance, inasmuch as the pins are in the present instance tapered from one side only, as may be clearly seen in Fig. 2.

O O' are two arms fixed upon a shaft P, pivoted between the cheek-plates A A', to constitute a rocking frame, which is operated in the rotation of the driving-spindle E by means of an eccentric $E^2$, fixed upon it and connected by the strap $E^3$ and rod $E^4$ to the lower end of the arm O. Each of the blocks $N^2$ has a pin $N^4$ projecting from one side of it and engaging with a slot in the adjacent arms O O, as shown in Fig. 1, so that upon operation of the arms O O' by means of the eccentric $E^2$ they will reciprocate the blocks $N^2$ and cause the pointed ends of the pins N to be alternately projected across and withdrawn from the passage-way between the frame $II^2$ and the cover-plate $II^3$, through which the film passes. For the feeding device a somewhat similar rocking frame is constituted by two arms Q Q', carried upon a shaft R, pivoted between the cheek-plates A A', and carrying between their free ends a wide roller $Q^2$, rotatable in bearings in the ends of these arms. The arms are connected by a cross-stay $Q^3$, to which is connected an eccentric-rod $E^4$, operated by an eccentric-shaft $E^5$, fixed upon the driving-spindle E. When the shaft E is rotated, the roller $Q^2$ is raised and lowered in an approximately vertical path extending downward from the lower end of the frame $H^2$.

It should be observed that the film on its passage through the lower end of the frame to the upper side of the drum $F^2$ is led below the wide roller $Q^2$, for a purpose which will hereinafter be explained.

The operation of the apparatus will now be described, assuming that the parts of the mechanism are in the positions in which they are indicated in Fig. 2 and that the film has been placed in the apparatus in the position in which it is shown in full lines in that view. In that figure a portion of the film is being retained in proper position for exposure by the pins N, which are in engagement with the marginal perforations $C^5$. Upon rotation of the shaft E in the direction indicated by the arrow in proximity thereto, Fig. 2, the pins N will commence to withdraw from the film and the drums $D^2$ and $F^2$ to rotate. As soon as the pins N have been completely withdrawn by the arms O O' from engagement with the portion of film between the frame H² and the cover-plate H³ the arms Q Q' will be sharply depressed by the eccentric E⁵, thereby causing the roller Q² to descend rapidly. About midway in its descent, when moving at its maximum speed, the roller Q² strikes sharply the loop or catenary of film lying in its path and between the parts H² F² and forces that part of the film to assume the more marked loop form indicated in dotted lines C⁴ in Fig. 2. The increase of film in this loop C⁴ in the lower part of the apparatus draws a fresh portion of the film from above the frame H² sharply into the space between that frame H² and the cover-plate H³ for exposure, thus causing the loop C³ to disappear for the moment and effecting very rapidly the removal from the said space of the section of film just previously exposed. The extent of the path traversed by the roller Q² and the primary sag of the loop on which it acts are so proportioned relatively to the pitch or distance apart of the pictures on the film that each step of the intermittent feed is properly and sufficiently effected by the roller Q³, and this being done the pins N move forward again to reëngage and adjust to proper register a fresh portion of film in the frame H². If by any chance this fresh portion of film has not been brought into exact register for exposure, the bevel-points N' of the pins N act as wedges in their passage into the marginal perforations C⁵ and impart such slight further movement to the film as may be necessary to properly center or register the same.

The movement of the pins N is so timed that they enter the film when it has arrived at the end of the movement imparted to it in the frame H² by the roller Q², and just before it is completely exposed to view or to the rays of the lens they effect the proper register of the film and, if required, hold it during the exposure and withdraw thereafter, or even withdraw slightly before the shutter returns and ends the period of exposure, leaving the film free to be moved as described in the interval between two exposures, which, as aforesaid, is shortened by reason of the rapidity with which the roller Q² is caused to operate. The vertical return movement of the roller Q² occurs during the interval the film is at rest in each operation, and in this period the loop C⁴ is drawn somewhat tauter into some such form as is indicated by full lines, in which the film is shown in Fig. 2.

Instead of the rocking frame Q Q' a sliding frame reciprocating along the path of the film can be used.

With reference to the supply-spool C and the receiving-spool C² it will be seen from the foregoing that the former spool decreases in size as the latter increases, and also that the feed devices intermediate between the two spools by which film is fed from one to the other operate to produce a forward feed at a rate which is constant.

To insure that film shall not be delivered too freely from the supply-spool C and to insure also that in spite of the steady increase in the diameter of the receiving-spool C² the film shall be maintained at the desired degree of tautness both between the supply-spool C and the drum D² and between the receiving-spool C² and the drum F², the following arrangements are made: Attached to a suitable fixed point on the framing is one end of a spring A⁵, the other end A⁶ of which bears upon the flange T' of a drum T, on which the supply of film is wound. No restraint is placed upon the free rotation of the supply-spool under the influence of the film in company with the drum T except the friction of the bearings and the action of the spring A⁵, which latter exerts sufficient retardation upon the drum T and spool C to insure the maintenance of the film between that spool and the drum D² always sufficiently taut.

The receiving-spool C² is carried on a flanged drum U, which is carried upon the spindle G, and has engaged with it a pin V, projecting from a disk V', fixed on the spindle G and entering a hole in one of the flanges U' of the drum. The spur-wheel G' is supported upon but is not fixed to the end of the spindle G. Between that wheel and a pin G², fixed in the adjacent end of the spindle, is a spring-washer G³, by which the wheel G' is kept always in sufficient frictional contact with the collar G⁴, fixed on the spindle G, to insure that although the wheel G' may always be able to effect rotation of the spindle G and spool C² by reason of the frictional engagement existing between the wheel and spindle yet if by reason of the increasing diameter of the body of film accumulating on the spool the periphery of the spool tends to overrun the film—that is to say, to wind it up too fast—the wheel will be able to overrun the spool by slipping upon the spindle.

It will be appreciated that by using the brake on the supply-spool C or on the film issuing therefrom and applying friction driving apparatus to the spool C² the drum D² can be dispensed with, but an immediate spool on the film direct to the supply-spool C would result. Therefore the chief function of the drum D² is to prevent this and always insure slack for easily pulling forward by the rapid action of the roller Q².

The shutter used with the apparatus shown in Figs. 1 and 2 is preferably one which rotates continuously and is fixed upon a shaft S, journaled in bearings A⁴ on the cheek-plate A and geared by a bevel-wheel S', which is fixed upon it to a bevel-wheel E⁶, fixed upon the shaft E.

In exposing the film for projection a shutter is not necessary, as the film is carried ahead with such speed that the eye of the observer cannot detect the change.

I claim—

1. In a kinetographic camera, the combination with the continuous film-feeding mechanism, of the pins mounted in suitable supports, mechanism for advancing the pins to cause them to enter perforations in the film to arrest the movement of the film, and an intermittent film-feeding device; substantially as described.

2. In a kinetographic camera, the combination with the mechanism for feeding the film continuously, of the tapered pins, mechanism for intermittently advancing the pins to enter perforations in the film, whereby the film may be brought to the proper position for exposure and retained there, and intermittent film-feeding mechanism; substantially as described.

3. In a film-exposing apparatus of the kind described the combination with a support such as $H^2$ of pins $N'$ tapered as at $N^2$ guide-bars $H^5$ and blocks $N^2$ so engaged with the pins and guides as to prevent the pins from turning about their own axes.

4. In a kinetographic camera, the combination with the continuous feed mechanism, the arms mounted on a shaft pivoted in the main frame, the frame mounted at the point of exposure, the pins carried in said frame, the blocks on said pins, the pins or studs projecting from the sides of the blocks and engaging in slots in the arms, whereby when the arms are reciprocated the pins will be moved back and forth, and mechanism for reciprocating the arms; substantially as described.

5. In a kinetographic camera, the combination with the continuous film-feeding mechanism, means for arresting the film, at the point of exposure, the pivoted horizontal frame, mechanism for reciprocating said frame vertically whereby in its downward movement it will strike the film and feed it forward; substantially as described.

6. In a kinetographic camera, the combination with the continuous film-feeding mechanism, means for arresting the film at the point of exposure, the horizontal pivoted frame, the drive-shaft, the eccentric mounted on the drive-shaft, connection between the pivoted frame and eccentric, whereby the frame will be reciprocated in substantially vertical path and in its downward movement will strike the film sharply and feed it forward; substantially as described.

In witness whereof I have hereto set my hand in the presence of the two subscribing witnesses

THOMAS HENRY BLAIR.

Witnesses:
HAROLD WADE,
HARRY B. BRIDGE.